United States Patent [19]

Alpkvist

[11] 4,365,951
[45] Dec. 28, 1982

[54] DEVICE FOR COMBUSTION OF A VOLATILE FUEL WITH AIR

[76] Inventor: Jan Alpkvist, Spindelgatan 2, SE-58258 Linköping, Sweden

[21] Appl. No.: 159,448

[22] Filed: Jun. 13, 1980

[51] Int. Cl.³ .............................................. F23N 5/00
[52] U.S. Cl. .................................... 431/82; 431/215; 431/161; 431/243; 431/247; 431/351; 60/737; 60/758
[58] Field of Search .................. 431/78, 82, 11, 77, 431/167, 162, 161, 247, 243, 354, 175, 215, 351; 432/178, 179; 60/737, 758

[56] References Cited

U.S. PATENT DOCUMENTS

| | | | |
|---|---|---|---|
| 2,155,880 | 4/1939 | Whitney | 431/77 |
| 2,930,191 | 3/1960 | Schirmer et al. | 60/39.29 |
| 3,564,847 | 2/1971 | Wagner | 60/39.71 |
| 3,667,221 | 6/1972 | Taylor | 60/737 |
| 4,050,238 | 9/1977 | Holzapfel | 60/737 |
| 4,255,122 | 3/1981 | Alpkvist et al. | 431/215 |
| 4,271,675 | 6/1981 | Jones et al. | 60/737 |

Primary Examiner—James C. Yeung
Assistant Examiner—Randall L. Green
Attorney, Agent, or Firm—Finnegan, Henderson, Farabow, Garrett & Dunner

[57] ABSTRACT

A combustion device of the type in which fuel is supplied in liquid phase through a "walking-stick" is improved by imparting a rotary movement to the air passing the "walking-stick". The fuel will form a film which is volatired and mixed so thoroughly with air that the temperature at the end of the "walking-stick" may be used as an indication of the prevailing proportion between the mass flows of supplied air and fuel.

4 Claims, 2 Drawing Figures

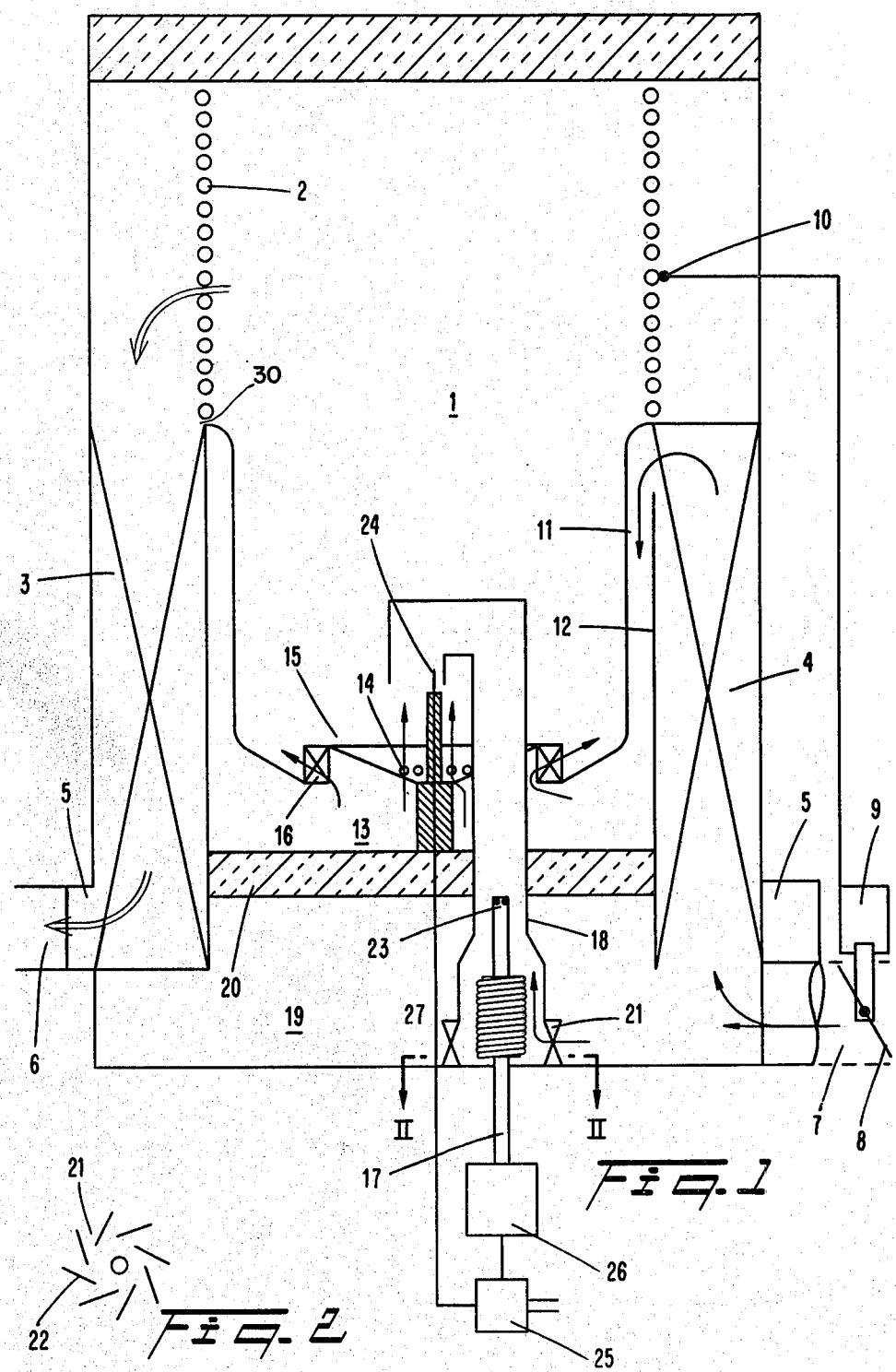

DEVICE FOR COMBUSTION OF A VOLATILE FUEL WITH AIR

BACKGROUND

1. Field of the Invention

This invention relates to a device for combustion of a volitile fuel with air and of the kind comprising a combustion chamber, means for preheating a substantial part of the air for the combustion by exchanging heat with exhaust gases leaving the device, a tube for introducing fuel into said chamber and for introducing a small part of combustion air together with the fuel, said tube terminating in said chamber in a direction towards an air inlet for the preheated air supplied to said combustion chamber.

2. Description of the Prior Art

In the known devices of the type referred to above the proportion of combustion air supplied together with the fuel through the tube may amount to e.g. 8 percent of the total amount of combustion air. This rich fuel-air mixture is volatised by passing the part of the tube extending into the combustion chamber. It has proved to be useful if the mixture can be uniform and if it may be a result from initially forming a fuel film on the inside of the tube.

SUMMARY OF THE INVENTION

According to the present invention this is obtained thereby that said tube is provided with angularly displaced air inlet openings limited by walls inclined relative the radial directions so as to cause a combined rotary and axially directed air flow in said tube.

BRIEF DESCRIPTION OF THE DRAWING

The invention will be described in more detail reference being made to the drawing in which FIG. 1 schematically and in vertical section shows a device according to the invention and in which FIG. 2 is a section along the line II—II of FIG. 1.

DESCRIPTION OF THE PREFERRED EMBODIMENT

In the embodiment shown the reference numeral 1 designates a combustion chamber. The combustion gases formed therein are shown with double arrows and pass initially a system of pipes 2 containing a fluid medium to be heated, such as the working gas of a Stirling cycle hot-gas engine. The gases then flow through an annular, counter-current flow heat exchanger 30 comprising a large number of parallel neighbouring channels 3, 4 separated by thin conductive walls. The channels 3 serve to guide the combustion gases while the channels 4 serve to guide the air for the combustion. The combustion gases leave the device via a manifold 5 to a stack 6.

The air for the combustion is supplied from a blower (not shown) and a duct 7 containing a flap valve 8 governed by a motor 9 influenced by a thermocouple 10 in response to the temperature of the tubes 10. In case the temperature is below a desired value the flap valve 8 is opened and more air for the combustion is supplied. The flow of air is illustrated by single arrows. Initially the air is preheated after entering past valve 8 in duct 7 by passing through the channels 4 and is further preheated by passing between two co-axial walls 11 and 12, the wall 11 partly limiting the combustion chamber 1. The air now reaches an upper central air chamber 13 from which it enters into the combustion chamber partly via holes 14 in a conically shaped wall 15 and partly via swirl openings 16 arranged between the walls 11 and 15.

Fuel is supplied via a pipe 17 extending coaxially into a tube 18 connecting the combustion chamber 1 with a lower control air chamber 19 separated from the upper central air chamber 13 by an insulating wall 20. The tube 18 is bent through 180 degrees at the part extending into the combustion chamber 1. Its direction at the terminating end is towards the entrance of the preheated air.

The lower end of the tube 18 is provided with air inlet openings 21 limited by a number of walls 22 inclined relative the radial direction as shown in FIG. 2. The air contained in the lower control air chamber 19 may pass into the tube 18 without being preheated, but the pressure drop is such that only about 8 percent of the air for the combustion will follow this path. The tube 17 is provided with a number of side openings 23 causing the fuel - which is in liquid phase - to be sprayed against the inner walls of the tube 18. The air passing the tube 18 will obtain a combined rotary and axially direction causing the fuel to adhere to the walls as a film moving towards the combustion chamber. Due to a complete volatising and thorough mixture of fuel and air the temperature at the end of the tube 18 will be almost constant at a constant proportion between fuel and air in the tube 18. Therefore, the temperature at the end of the tube 18 - measured by a thermo-couple 24 - may be used as a signal depending on the proportion between the total mass flows of fuel and air supplied.

The temperature signal from the thermo-couple is supplied to a governing device 25 controlling a valve 26 regulating the fuel supply.

An electric heater coil 27 is used for starting up the device but forms no part of the invention.

In case the load on the device is increased (causing a lower temperature of the tubes 2) the thermo-couple 10 will cause the motor 9 to open the flap valve 8 and supply more air for the combustion. The mass flow of air will increase through the preheater as well as through the tube 18 causing a more lean fuel/air mixture and a lower temperature at the end of the tube 18, said temperature being measured by the thermo-couple 24.

The signal of decreasing temperature is now used for opening the valve 26 causing increase of fuel supply to the device.

I claim:

1. A device for combustion of a volatile fuel with air of the kind comprising a combustion chamber, means for preheating a substantial part of combustion air by exchanging heat with exhaust gases leaving the device, a tube for introducing fuel into said chamber and for introducing a small part of combustion air together with the fuel, said tube extending within and terminating in said chamber in a direction towards an air inlet for the preheated air supplied to said combustion chamber, characterized in that said tube is provided with means for providing substantially complete volatization and mixing of the fuel with said combustion air part in said tube, said volatization and mixing means including angularly displaced air inlet openings at the tube inlet limited by walls inclined relative to the radial directions so as to cause a combined rotary and axially directed air flow in said tube and means for forming a fuel film on the inside surface of said tube at a point distant from the tube termination, said film being moved toward the tube termination by said rotary and axial air flow in said tube and volatizing and mixing with said air flow, and wherein said device further includes means for measuring the temperature of said volatized and mixed fuel and air exiting said tube and for controlling the amount of fuel admitted to said tube using said temperature measurement.

2. A device according to claim 1 wherein said film forming means includes a pipe having radially directed openings extending coaxially into said tube for introducing fuel.

3. A device according to claim 1 wherein said temperature measuring means includes a thermo-couple positioned at the termination of said tube to intercept said volatized fuel/air mixture and wherein a fuel valve means operatively connected to said thermo-couple is provided to govern the mass flow of fuel into said tube in response to the prevailing temperature at the termination of said tube.

4. Apparatus for controlling the mixture of volatile fuel and air for combustion in a device of the kind having a combustion chamber, conduit means for supplying combustion air to the combustion chamber, means for preheating a substantial part of combustion air by exchanging heat with exhaust gases leaving the device, a tube for introducing fuel into said chamber and for introducing a small part of combustion air together with the fuel, said tube extending within and terminating in said chamber in a direction towards an air inlet for the preheated air supplied to said combustion chamber, the apparatus comprising:

(a) means positioned in the conduit for regulating the combustion air flow entering the device, wherein the tube is located downstream of said air regulating means with respect to the combustion air flow, and wherein air admitted to said tube is a fixed percentage of the total combustion air flow;

(b) fuel/air conditioning means for providing substantially complete volatization and mixing of the fuel and air within said tube including (i) means for inducing both radial and axial motion to the air admitted to said tube, and (ii) means for forming a liquid fuel film on the inner surface of said tube at a location distant from the termination of said tube, said fuel film being moved along said inner suface toward the tube termination by said radially and axially flowing admitted air and being volatized in part by heat transmitted through the tube wall to said film from the combustion chamber;

(c) means for sensing the conditioned fuel/air mixture temperature exiting said tube, the temperature of said conditioned fuel/air mixture exiting said tube corresponding essentially uniquely to the overall fuel/air ratio in the device; and (d) control means for adjusting fuel flow based on the sensed fuel/air mixture temperature.

* * * * *